UNITED STATES PATENT OFFICE.

CHRISTIAN RUDOLPH AND BERNHARD PRIEBS, OF OFFENBACH-ON-THE-MAIN, GERMANY, ASSIGNORS TO K. OEHLER, OF SAME PLACE.

ORANGE AZO DYE-STUFF.

SPECIFICATION forming part of Letters Patent No. 395,634, dated January 1, 1889.

Application filed June 12, 1888. Serial No. 276,876. (No specimens.)

*To all whom it may concern:*

Be it known that we, CHRISTIAN RUDOLPH and BERNHARD PRIEBS, subjects of the Emperor of Germany, and residing at Offenbach-on-the-Main, Germany, have invented new and useful Improvements in Orange Coloring-Matter, of which the following is a specification.

The method of producing these new orange azo dyes consists of two distinct operations. We first produce a peculiar so-called "intermediate" compound of the formula—

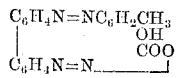

by treating tetrazo-ditolylchloride with one molecule β cresotinic acid. (*Beilstein's Handbook*, first edition, page 1458.) In the second operation this intermediate compound is treated with the sodium salt of toluylendiaminesulpho-acid and produces the dye-stuff.

We proceed as follows:

*First, method of producing the intermediate compound from tolidin and β cresotinic acid.*— 21.2 pounds of tolidin are dissolved in forty-eight pounds of muriatic acid of 20° Baumé, and five hundred pounds of water cooled with ice and added to a solution of twenty-eight pounds of nitrate of soda in one hundred and fifty pounds of water. This solution of tetrazo-ditolylchloride is allowed to run slowly into a solution of 15.2 pounds of β cresotinic acid and twenty pounds of soda in three hundred pounds of water. The intermediate compound precipitates slowly as voluminous yellow-brown flakes, and is filtered off.

*Second, production of the dye-stuff.*—A solution of twenty-three pounds of the sodium salt of toluylendiaminesulpho-acid and six pounds of soda in three hundred pounds of water is prepared, and the intermediate compound above obtained is added to it. The formation of the dye-stuff begins at once. It is filtered off, pressed, and dried as soon as the reaction is finished.

The dye-stuff is a red-brown powder, which dissolves easily in hot water. The solution in concentrated sulphuric acid is violet-red.

In the above-described process it is possible to substitute the γ cresotinic acid (*Beilstein's Handbook*, page 1459) for the β acid without changing the result. In both cases an orange dye-stuff is obtained which is equally suitable for dyeing cotton without mordant.

Having thus described our invention and the manner of employing the same, what we claim, and wish to have secured to us by Letters Patent of the United States of America, is—

The orange azo dye-stuff herein described, produced from tolidin by diazotation and subsequent heating with cresotin acid and toluylendiaminesulpho-acid, and which is a red-brown powder which dissolves easily in hot water, and the solution of which in concentrated sulphuric acid is violet-red.

In testimony whereof we have signed our names to this specification in the presence of two subscribing witnesses.

CHRISTIAN RUDOLPH.
BERNHARD PRIEBS.

Witnesses as to Christian Rudolph:
JOSEPH PATRICK,
ALVESTO S. HOGUE.

Witnesses as to Bernhard Priebs:
JACOB MUELLER,
JEAN GRUND.